(12) United States Patent
Sakaki

(10) Patent No.: US 7,672,064 B2
(45) Date of Patent: Mar. 2, 2010

(54) OPTICAL ELEMENT AND OPTICAL UNIT

(75) Inventor: Takeshi Sakaki, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 76 days.

(21) Appl. No.: 11/958,228

(22) Filed: Dec. 17, 2007

(65) Prior Publication Data

US 2008/0186592 A1 Aug. 7, 2008

(30) Foreign Application Priority Data

Jan. 17, 2007 (JP) .......................... P2007-008516

(51) Int. Cl.
*G02B 9/00* (2006.01)
*G02B 9/08* (2006.01)

(52) U.S. Cl. ...................... 359/738; 359/796
(58) Field of Classification Search ................. 359/738, 359/796, 797, 811
See application file for complete search history.

(56) References Cited

U.S. PATENT DOCUMENTS

| 7,406,223 | B2 * | 7/2008 | Ito | ............................... 385/33 |
|---|---|---|---|---|
| 2003/0099045 | A1 | 5/2003 | Doi | |
| 2005/0123238 | A1 | 6/2005 | Ito | |
| 2005/0226608 | A1 | 10/2005 | Kwon et al. | |
| 2005/0264895 | A1 | 12/2005 | Chao | |

| 2008/0170297 | A1 * | 7/2008 | Shinozawa | ................... 359/652 |

FOREIGN PATENT DOCUMENTS

| CN | 1627105 A | 6/2005 |
|---|---|---|
| EP | 1 443 755 A2 | 8/2004 |
| EP | 1 857 841 A1 | 11/2007 |
| EP | 1947500 A1 * | 7/2008 |
| JP | 2002-303703 A | 10/2002 |
| KR | 2005-0025321 A | 3/2005 |
| WO | WO-2004/005977 A1 | 1/2004 |

OTHER PUBLICATIONS

Korean Office Action from family case KR 10-2007-0133547 (Oct. 26 2009).

* cited by examiner

*Primary Examiner*—David N Spector
(74) *Attorney, Agent, or Firm*—Birch, Stewart, Kolasch & Birch, LLP

(57) ABSTRACT

An optical unit includes one or more optical elements 15 and 25. At least one of the one or more optical elements has an optical functional surface that refracts incident light and rough surfaces 19 and 29 formed on an outer side with respect to the optical functional surface. The rough surfaces scatter the incident light which has been internally reflected. With this configuration, the rough surface formed on the surface located on the outer side with respect to the optical functional surface scatters the light which is incident on the optical element and which may generate ghost due to its internally reflection by the surface located on the outer side with respect to the optical functional surface. Therefore, generation of the ghost is suppressed. Also, since the optical unit includes the optical element having the rough surface, the generation of the ghost is suppressed.

14 Claims, 10 Drawing Sheets

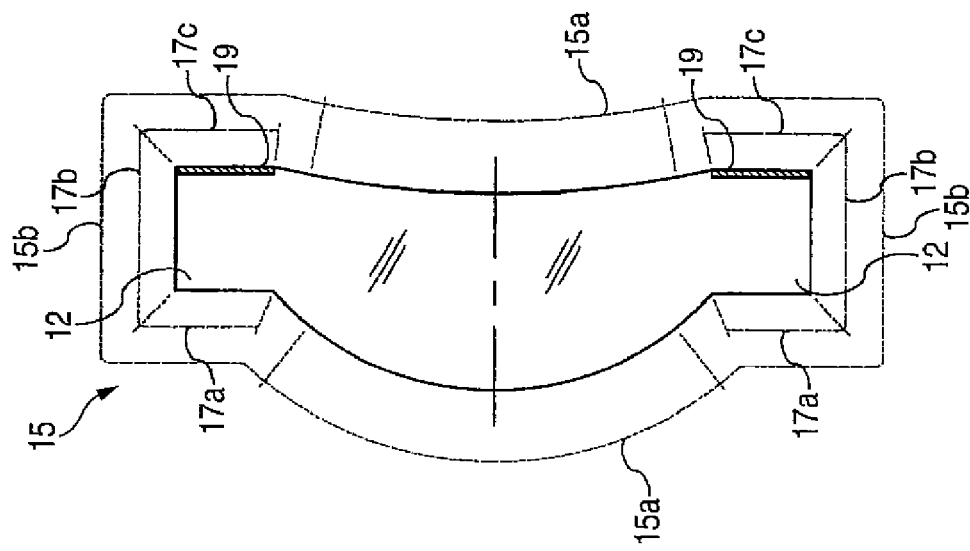
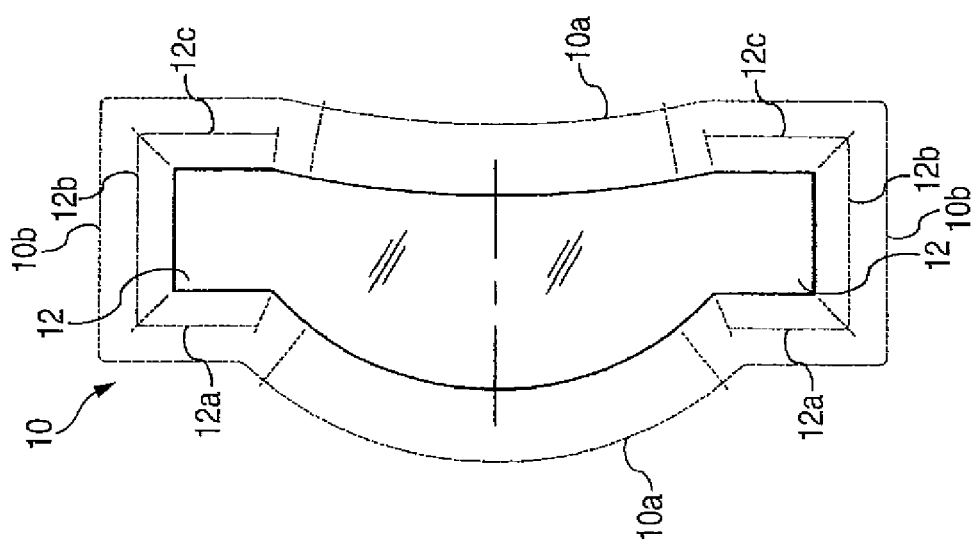

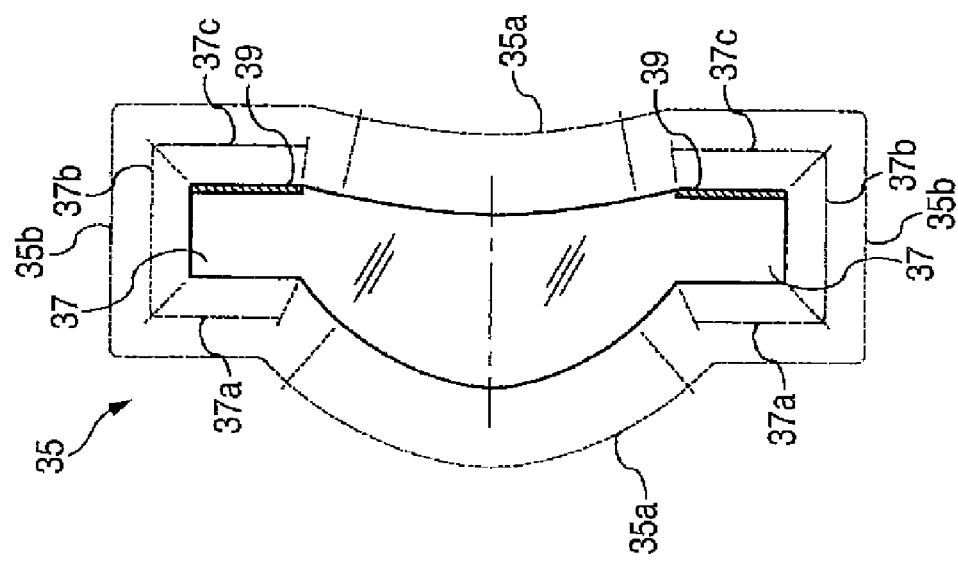
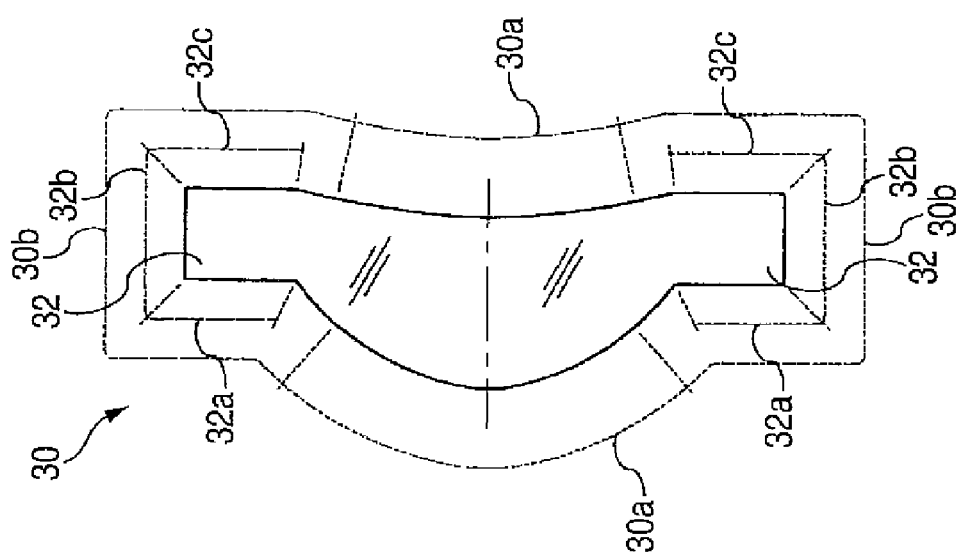
FIG. 5 (a)
FIG. 5 (b)

OPTICAL ELEMENT AND OPTICAL UNIT

CROSS-REFERENCE TO RELATED APPLICATIONS

This application is based upon and claims the benefit of priority from the Japanese Patent Application No. 2007-8516 filed on Jan. 17, 2007; the entire contents of which are incorporated herein by reference.

BACKGROUND OF THE INVENTION

1. Technical Field

The invention relates to an optical element and an optical unit.

2. Description of the Related Art

Various optical lenses for use in an optical unit have been developed in accordance with reduction of the optical unit in size and weight and multiple functions of the optical unit. For example, in an optical unit for use in a cellular phone having a camera function or a vehicle rear-view monitor, wide-angle lenses having a view angle equal to or larger than a view angle (about 45 to 50 degrees) of a standard lens are frequently used. Particularly, in an optical unit for use in a cellular phone, optical lenses having wide view angels, which have not been used conventionally, are used as the cellular phones becomes thin.

Accordingly, there is the case where unintended light having an incidence angle larger than that of a general wide-angle lens is incident on the optical lens and is reflected inside the optical lens, the optical unit, and the like. As a result, ghost, flare, or the like may be generated. When the ghost is generated, a false image or multiple images of an object are observed through the optical unit due to light that contributes to image formation. Also, when the flare is generated, the contrast of the original image is reduced or colors in a color picture become murky due to light that does not contribute to image formation.

Since a processing accuracy required for an optical lens is improved, when an surface located on the outer side with respect to an optical functional surface of an optical lens is processed with the same degree in accuracy as that for the optical functional surface, internal reflection of the light incident on the optical lens is enhanced, which is one cause of generation of the ghost or the like. The optical functional surface of the optical lens represents a range, up to an outer side, including a range of an effective diameter (diameter, in a section perpendicular to an optical axis, of a bundle of parallel light, which comes from a point at infinity on the optical axis and passes the optical lens) of the optical lens. It is difficult to process an optical lens in accordance with a designed shape for implementing the function of the optical lens, in a molding process only for the range of the effective diameter. Therefore, the optical functional surface means a range which is molded in accordance with a predetermined designed shape for implementing a function as an optical lens as well as the range of the effective diameter.

In order to solve these problems, for example, JP 2002-303703 A discloses the following solutions: As a first solving method, JP 2002-303703 A proposes blocking light so as not to enter through a portion shielded by a light shielding plate or a concave surface by making the light shielding plate that surrounds a lens surface to protrude toward a front side of the lens surface or by providing the optical lens within the concave surface that surrounds the lens surface. Also, as a second solving method, JP 2002-303703 A proposes blocking light so as not to enter through a portion in which a light shielding film is formed, by forming the light shielding film in a portion of the lens surface where light shielding is required. Furthermore, as a third solving method, JP 2002-303703 A proposes, when it is applied to a lens array, blocking light so as not to enter through a portion where a rough surface portion is formed, by forming the rough surface portion in a lens adjacent portion of the optical lens which requires light shielding so that the rough surface portion scatters the light.

However, the first solving method results in that the manufacturing cost increases as an additional component for forming the light shield plate or the concaved part is used while a request for thinning and lightening the optical unit cannot be achieved. Also, the second or third solving method blocks incident light from a portion of the lens surface that requires light shield. However, when light having a large incident angle which is a cause of the ghost or the like is incident in the effective diameter of the lens, light originally required for forming an image is blocked as well as unintended light. Accordingly, it is difficult to fully solve these types of problems only by controlling light incident on the optical lens.

Thus, a method for controlling internal reflection of light incident on the optical lens is applied instead of or in addition to controlling of the light incident on the optical lens. For example, it may be conceived that an antireflection film is formed on a surface, which reflects the incident light, located on an outer side with respect to the optical functional surface. In this method, the antireflection film is formed by printing, film adhesion, deposition or exposure on the surface located on the outer side that the optical functional surface of the optical lens molded by an injection molding method or a press molding method. However, when the printing or the film adhesion is used, an accuracy of the formed reflection film is low and it is difficult to manage its quality. On the other hand, when the deposition or the exposure is used, the manufacturing cost for forming the antireflection film increases. Also, when any of these methods is used, a secondary process after molding of the optical lens is required. Therefore, it is inevitable that manufacturing process becomes complex and that the manufacturing cost increases.

SUMMARY OF THE INVENTION

In view of the above circumstances, the invention has been made and provides novel and improved optical element and optical unit which can suppress generation of ghost or the like.

In order to solve the above object, according to an aspect of the invention, an optical element includes an optical functional surface and a rough surface. The optical functional surface refracts incident light. The rough surface is formed on a surface located on an outer side with respect to the optical functional surface. The rough surface scatters the incident light which has been internally reflected. With this configuration, the rough surface formed on the surface located on the outer side with respect to the optical functional surface scatters the light which is incident on the optical element and which may generate ghost due to its internal reflection by the surface located on the outer side with respect to the optical functional surface. Therefore, generation of the ghost is suppressed.

The optical element may further include a flange part located on an outer side with respect to the optical functional surface. The rough surface is disposed on a surface that forms the flange part. With this configuration, the rough surface of the flange part scatters the light which generates the ghost or the like due to internal reflection by the flange part.

Also, the rough surface may be formed to have a ten-point mean roughness (Rz) in a range of 4 μm to 25 μm. With this configuration, since the rough surface having sufficient roughness is formed on the outer side with respect to the optical functional surface, the rough surface sufficiently scatters the light internally reflected by the surface located on the outer side with respect to the optical functional surface.

The optical element may be made of glass. With this configuration, formed is the optical element, which is made of glass and which can suppress suppressing the ghost or the like.

The optical element may be made of plastic. With this configuration, formed is the optical element, which is made of plastic and which can suppress the ghost or the like.

According to another aspect of the invention, an optical unit includes one or more optical elements. At least one of the one or more optical elements includes an optical functional surface and a rough surface. The optical functional surface refracts incident light. The rough surface is formed on a surface located on an outer side with respect to the optical functional surface. The rough surface scatters the incident light which has been internally reflected. With this configuration, the rough surface formed on the surface located on the outer side with respect to the optical functional surface scatters the light which is incident on the optical element and which may generate ghost when it is internally reflected by the surface located on the outer side with respect to the optical functional surface. Therefore, generation of the ghost is suppressed. Also, since the optical unit includes the optical element having the rough surface, the generation of the ghost is suppressed.

As described above, according to any of the above configurations, the optical element and the optical unit that can suppress the generation of ghost or the like can be provided.

BRIEF DESCRIPTION OF THE DRAWINGS

FIG. 2 is an enlarged section view showing optical elements shown in FIG. 1.

FIG. 5 is an enlarged section view showing optical elements shown in FIG. 4.

DETAILED DESCRIPTION OF EMBODIMENT(S) OF THE INVENTION

Figure 1:
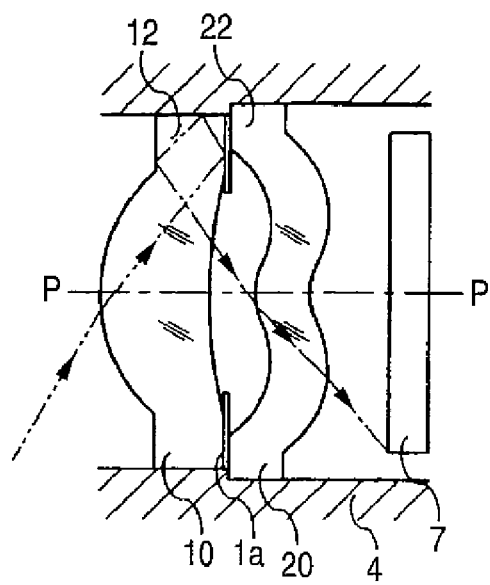
FIG. 1 is a section view showing a main portion of an optical unit according to a first embodiment of the invention.
Figure 1:
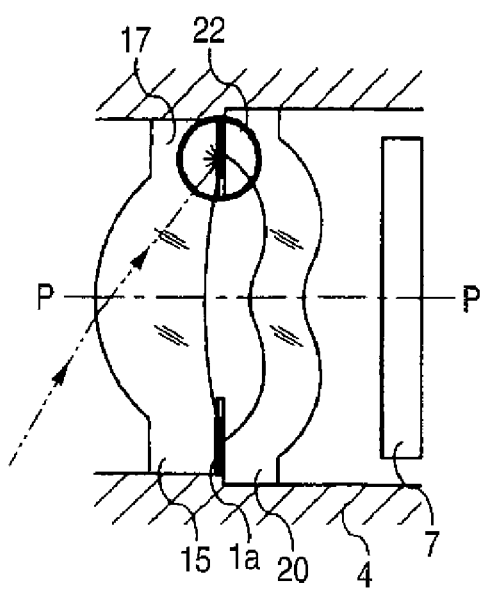
Figure 1:
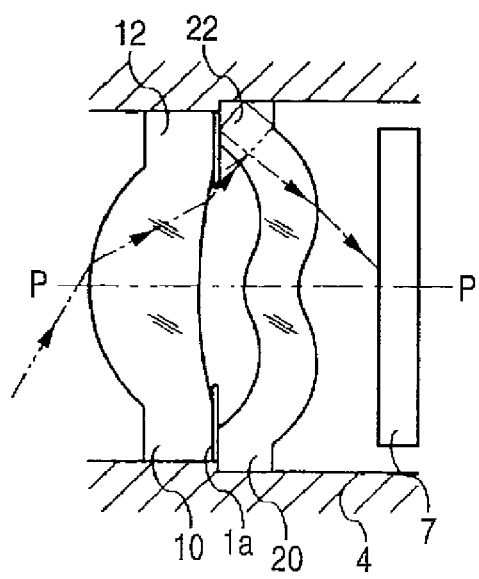
Figure 1:
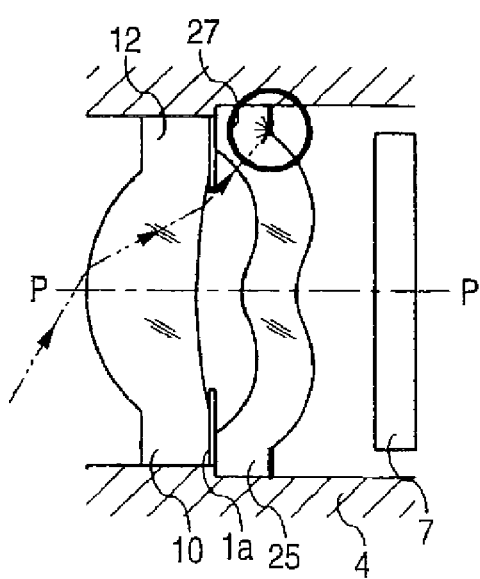

Hereinafter, exemplary embodiments of the invention will be described in detail with reference to the accompanying drawings. In the specification and drawings, like reference numerals in the drawings denote like elements, and thus a duplicate description thereon will be omitted.

First, an optical unit according to a first embodiment of the invention will now be described. FIG. 1 is a section view showing a main portion of the optical unit according to the first embodiment of the invention. FIGS. 1(a) and 1(c) show the cases where ghost or the like is generated due to incidence of unintended light. FIGS. 1(b) and 1(d) show the cases where the generation of ghost or the like is suppressed by forming rough surfaces 19 and 29 on surfaces 15b and 25b located on an outer side with respect to optical functional surfaces.

Figure 3:
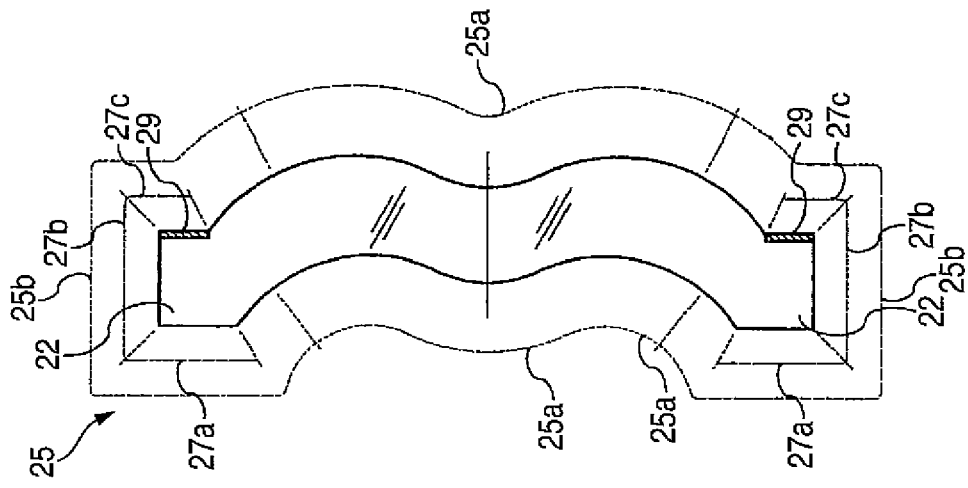
FIG. 3 is an enlarged section view showing the optical elements shown in FIG. 1.
Figure 3:
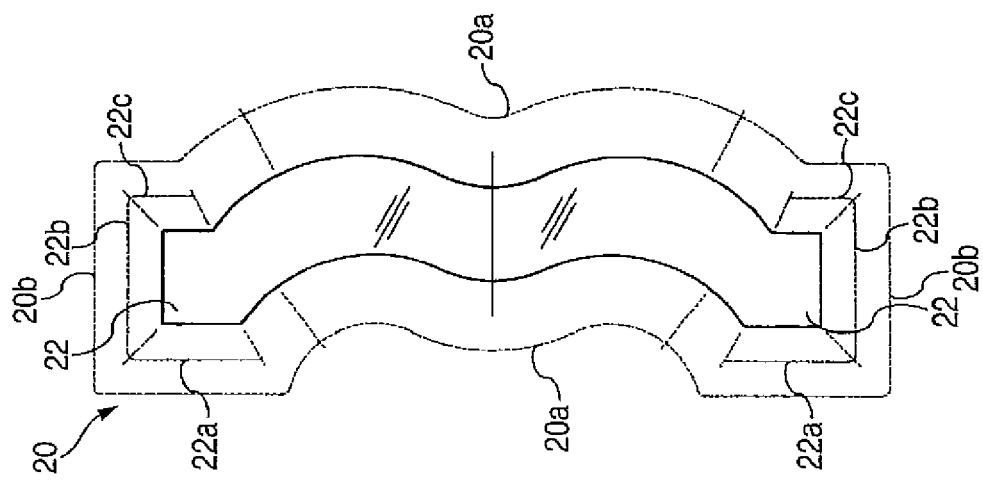

FIGS. 2 and 3 are enlarged section views showing the optical elements shown in FIG. 1. FIGS. 2(a) and 2(b) show first optical elements 10 and 15. FIGS. 3(a) and 3(b) show second optical elements 20 and 25.

As shown in FIG. 1, the optical unit according to this embodiment includes the first optical element 10, 15 having flange parts 12, 17 and the second optical element 20, 25 having flange parts 22, 27. A holding part 4 of the optical unit holds the first and second optical elements 10, 15, 20, 25 so that the first and second optical elements 10, 15, 20, 25 have a common optical axis P, with a diaphragm plate 1a interposed therebetween. On the rear side of the optical elements 10, 15 and 20, 25, an imaging device 7 for receiving light passing through the optical elements 10, 15 and 20, 25 and performing photoelectric conversion for the received light is disposed.

The optical element 10, 15, 20, 25, for example, the optical element 10 as shown in FIG. 2(a), is configured to have optical functional surfaces 10a and surfaces 10b which include surfaces 12a to 12c of the flange parts 12 and which are located on the outer side with respect to the optical functional surfaces 10a. It should be noted that the configurations shown in FIGS. 2 and 3 are just examples. The invention is not limited thereto. In the following descriptions, it is assumed that each flange part 12 includes a front surface 12a and a rear surface 12c which face the optical axis P, and a side surface 12b which is substantially parallel to the optical axis P. However, the surface configuration of the flange part 12 is not limited thereto.

FIG. 1(a) shows the case where ghost or the like is generated due to the first optical element 10. As shown in FIG. 1(a), light which has a large incidence angle and which is incident on the first optical element 10 is repeatedly internally reflected by the surfaces 10b located on the outer side with respect to the optical functional surfaces, particularly by the rear, side, and front surfaces 12a to 12c of the flange parts 12. Then, the light is emitted from the first optical element 10, passes through the second optical element 20, and reaches the imaging device 7. Accordingly, a false image or multiple images due to the light that has been internally reflected by the surface 10b located on the outer side relative to the optical functional face of the first optical element 10 is formed together with the original image, to thereby generate ghost or the like.

FIG. 1(c) shows the case where ghost or the like is generated due to the second optical element 20. As shown in FIG. 1(c), light which has a large incidence angle and which is incident on the first optical element 10 passes through the first optical element 10, is incident on the second optical element 20, is repeatedly internally reflected by the surfaces 20b located on the outer side with respect to the optical functional surfaces, particularly, by the rear, side, and front faces 22a to 22c of the flange parts 22. Then, the light is emitted from the second optical element 20 and reaches the imaging device 7. Accordingly, the light that has been internally reflected by the surfaces 20b located on the outer side with respect to the optical functional face of the second optical element 20 reaches the imaging device 7 together with the original image, to thereby generate ghost or the like.

The optical element is molded by an injection molding method, a press molding method, or the like. The injection molding method is a molding method for molding an optical element from a molding material by respective steps of mold clamping, injection, pressure keeping, cooling, plasticization, and mold opening. In the injection molding method, for example, a desired optical element is molded by tightly clamping a shaping mold under pressure equal to or larger than an injection pressure, injecting a molding material into the shaping mold, maintaining pressure applied to the molding material, and cooling and hardening the molding material. Also, the press molding method is a molding method for molding an optical element from a molding material by using a pair of shaping molds having a transfer surface including an optical functional transfer surface and a body mold in which the shaping mold is inserted. In the press molding method, for example, a desired optical element is molded by placing the molding material in the first shaping mold, transferring the transfer surface by pressing the molding material in the first and second shaping molds with the molding material heated and softened, and cooling the molding material with the transfer maintained. Here, as a molding material for the optical element, a molding material such as glass or plastic is used.

Rough surfaces 19, 29 are formed on the surfaces 15*b*, 25*b*, which are located on the outer side with respect to the optical functional surfaces, of at least one of the optical elements forming the optical unit according to this embodiment, particularly, on at least one of the front, rear and side surfaces 17*a* to 17*c*, 27*a* to 27*c* of the flange parts 17, 27. In the optical elements 15, 25 shown in FIGS. 2 and 3, the rough surfaces 19, 29 are formed only on the rear surfaces 17*c*, 27*c* of the flange parts 17, 27. The rough surfaces 19, 29 may be formed on the whole surfaces 15*b* and 25*b* located on the outer side with respect to the optical functional surfaces or may be formed on a part of the surfaces 15*b* and 25*b* located on the outer side with respect to the optical functional surfaces.

The roughness of the rough surfaces is determined based on a degree of ghost generation before the rough surfaces are provided, a required degree of ghost suppression, an arrangement error, and the like. Here, it is preferable that the rough surfaces 19 and 29 are formed to have the ten-point mean roughness (Rz) in the range of 4 μm to 25 μm. It is concerned that an error may occur in arrangement of the optical element 15, 25 by forming the rough surfaces 19, 29 on the flange parts 17*a* to 17*c*, 27*a* to 27*c*. However, the rough surfaces having the above-described degree of roughness do not have effects on the arrangement errors. Accordingly, since the rough surfaces 19, 29 having sufficient roughness are formed on the surfaces 15*b*, 25*b* located on the outer sides with respect to the optical functional surfaces, the surfaces 15*b*, 25*b* located on the outer side with respect to the optical functional surfaces sufficiently scatter the internally reflected light. In a process for preparing a shaping mold, the rough surfaces 19, 29 are formed in advance on corresponding transfer surfaces of the shaping mold. Therefore, the rough surfaces 19, 29 are transferred together with the optical functional surfaces 15*a*, 25*a* in a molding process using an injection molding method, a press molding method, or the like. In experiments performed by applicant and the like, it was confirmed that generation of the ghost phenomenon was good suppressed by forming the rough surfaces 19, 29 having the above-described accuracy.

As shown in FIG. 1(*a*), in the case where the ghost or the like is generated due to the first optical element 10, the first optical element 15 shown in FIG. 2(*b*) is used instead of the first optical element 10 (FIG. 3(*a*)). Thereby, generation of the ghost or the like is suppressed as shown in FIG. 1(*b*). That is, since the light which has a large incidence angle and which is incident on the first optical element 15 is scattered by the surfaces 15*b* located on the outer side with respect to the optical functional surfaces, particularly, by the rough surfaces 19 formed on the rear surfaces 17*c* of the flange part 17, the light internally reflected by the flange surfaces 17*a* to 17*c* of the first optical element 15*a* does not form false image or multiple images. As a result, generation of the ghost or the like is suppressed.

Figure 4:
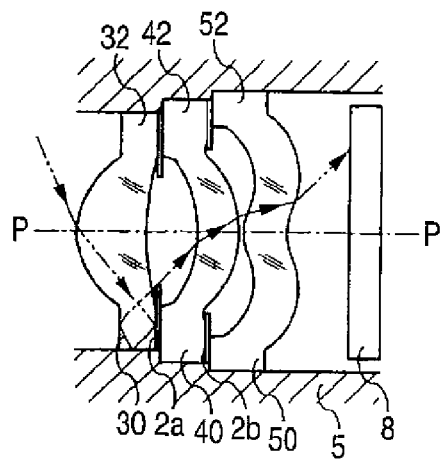
FIG. 4 is a section view showing a main portion of an optical unit according to a second embodiment of the invention.
Figure 4:
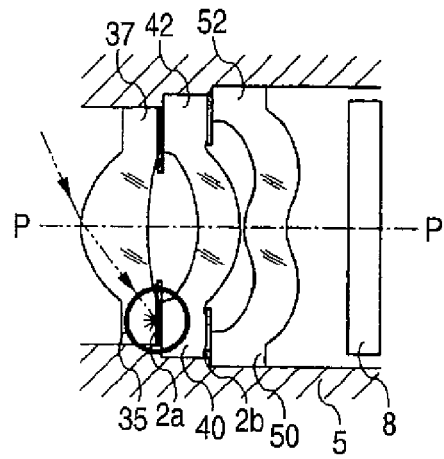
Figure 4:
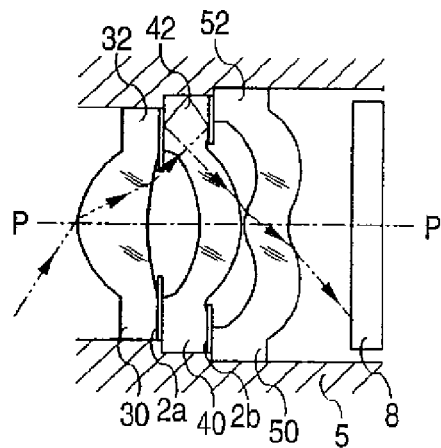
Figure 4:
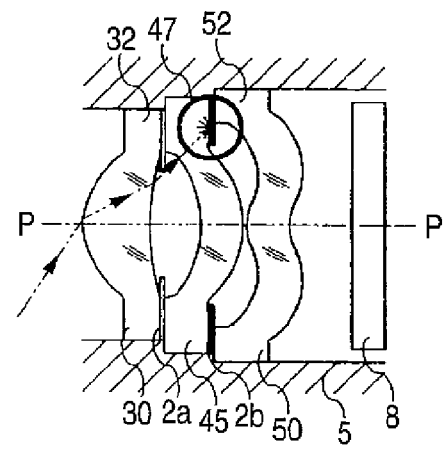
Figure 4:
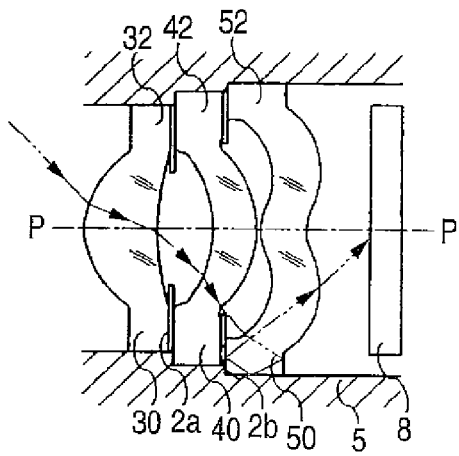
Figure 4:
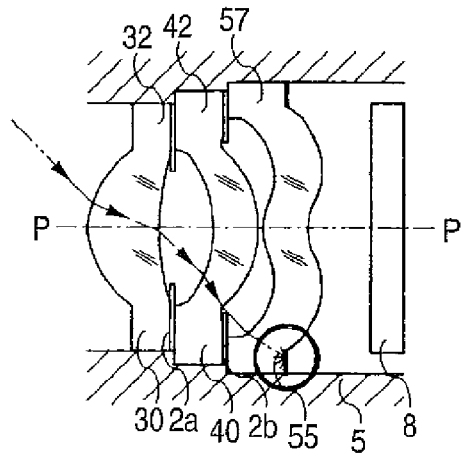

In addition, in the case where the ghost or the like is generated due to the second optical element 20 as shown in FIG. 1(*c*), the second optical element 25 shown in FIG. 3(*b*) is used instead of the second optical element 20 (FIG. 4(*a*)). Thereby, generation of the ghost or the like is suppressed as shown in FIG. 1(*d*). That is, since the light which has a large incidence angle and which is incident on the first optical element 10 passes through the first optical element 10, is incident on the second optical element 25, and is scattered by the surfaces 25*b* located on the outer side with respect to the optical functional surfaces, particularly, by the rough surfaces 29 formed on the rear surfaces 27*c* of the flange part 27, the light internally reflected by the flange surfaces 27 of the second optical element 25*a* does not form a false image or multiple images. As a result, generation of the ghost or the like is suppressed.

The surfaces 15*b*, 25*b*, on which the rough surfaces 19, 29 are formed, located on the outer side with respective to the optical functional surfaces are determined based on optical simulation or the like performed in advance. Depending on the result of the optical simulation, the rough surfaces may be formed on the surfaces 15*b*, 25*b* (for example, the rear, side, and front surfaces 17*a* to 17*c*, 27*a* to 27*c* of the flange parts 17, 27) located on the outside side with respect to a plurality of optical functional surfaces of a plurality of optical elements (for example, the first and second optical elements 15 and 25).

With the optical unit according to this embodiment, light which is incident on the optical elements 15, 25 and which may generate ghost or the like when it is internally reflected by the surfaces 15*b*, 25*b* located on the outer side with respect to the optical functional surfaces is scattered by the rough surfaces 19, 29 formed on the surfaces 15*b*, 25*b* located on the outer side with respect to the optical functional surfaces. Therefore, generation of the ghost or the like is suppressed. Also, since the optical unit includes the optical elements 15, 25 formed with the rough surfaces 19, 29, the generation of the ghost or the like in the optical unit is suppressed. Accordingly, there can be provided an optical unit capable of suppressing the generation of the ghost or the like without requiring a secondary process to be performed after molding of the optical lens and without requiring a complex manufacturing process or increasing the manufacturing cost.

FIG. 4 is a section view showing a main portion of an optical unit according a second embodiment of the invention. FIGS. 4(*a*), 4(*c*), and 4(*e*) show the cases where ghost or the like is generated due to incidence of unintended light. FIGS. 4(*b*), 4(*d*), and 4(*f*) show the cases where the generation of ghost or the like is suppressed by forming rough surfaces 39, 49, 59 on surfaces 35*b*, 45*b*, 55*b* located on an outer side with respect to optical functional surfaces. Hereinafter, the optical unit according to this embodiment will be described while duplicate descriptions for parts which are the same as those in the first embodiment will be omitted.

Figure 6:
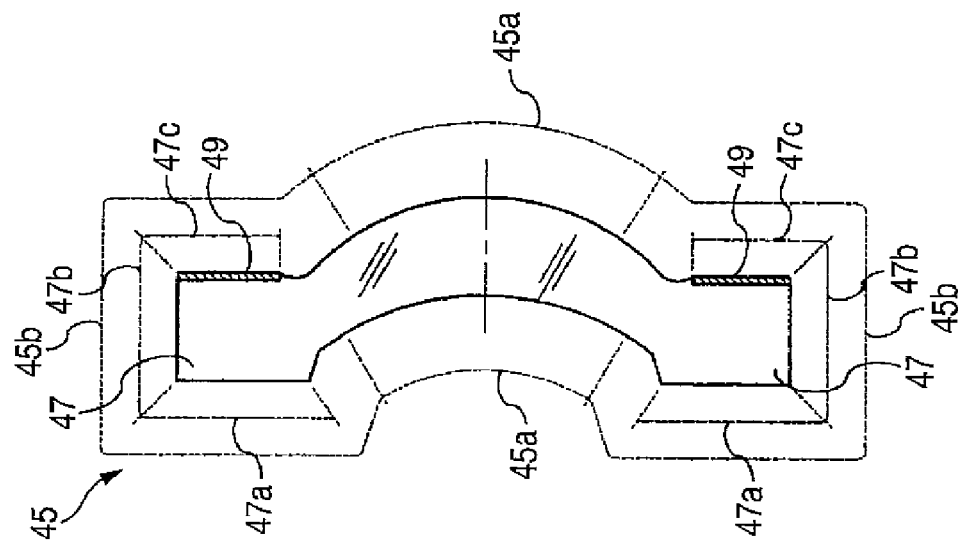
FIG. 6 is an enlarged section view showing the optical elements shown in FIG. 4.
Figure 6:
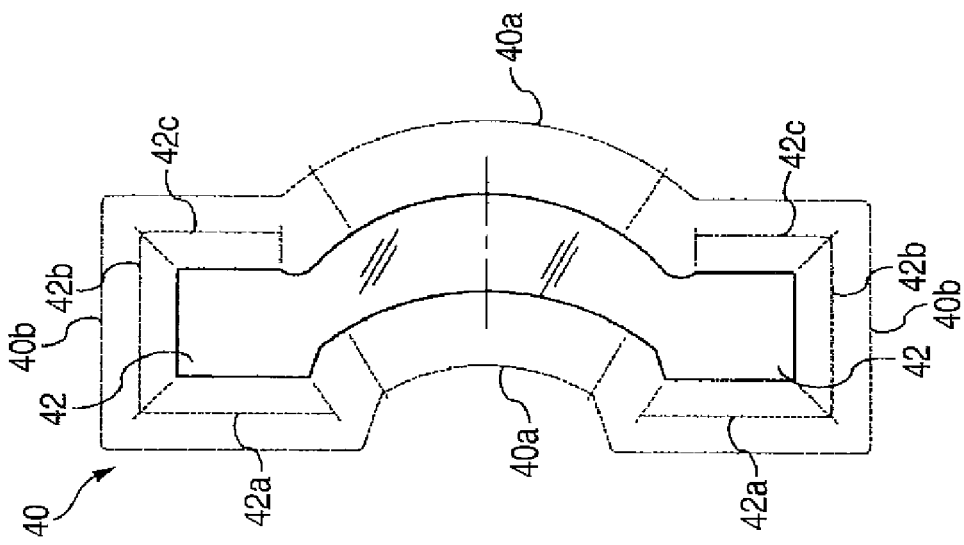
Figure 7:
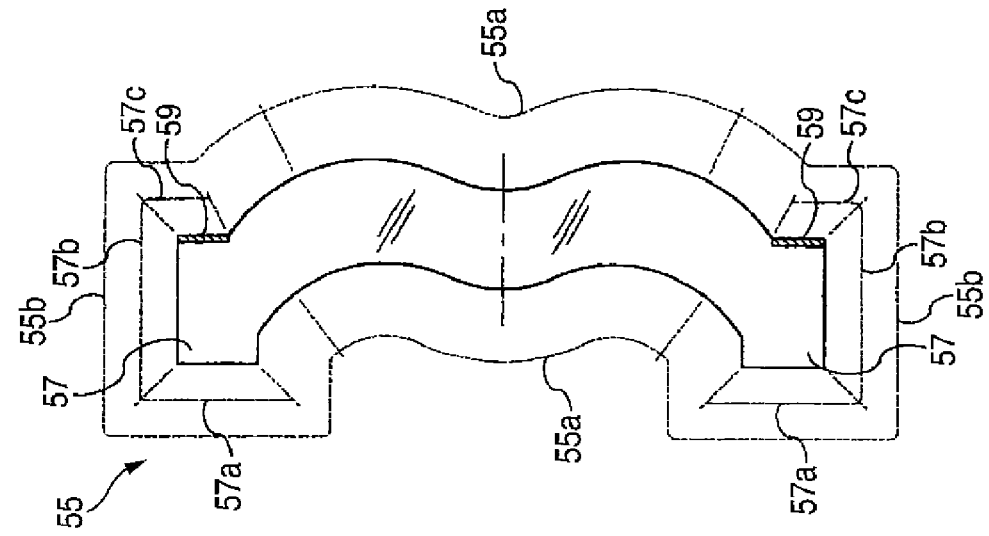
FIG. 7 is an enlarged section view showing the optical elements shown in FIG. 4.
Figure 7:
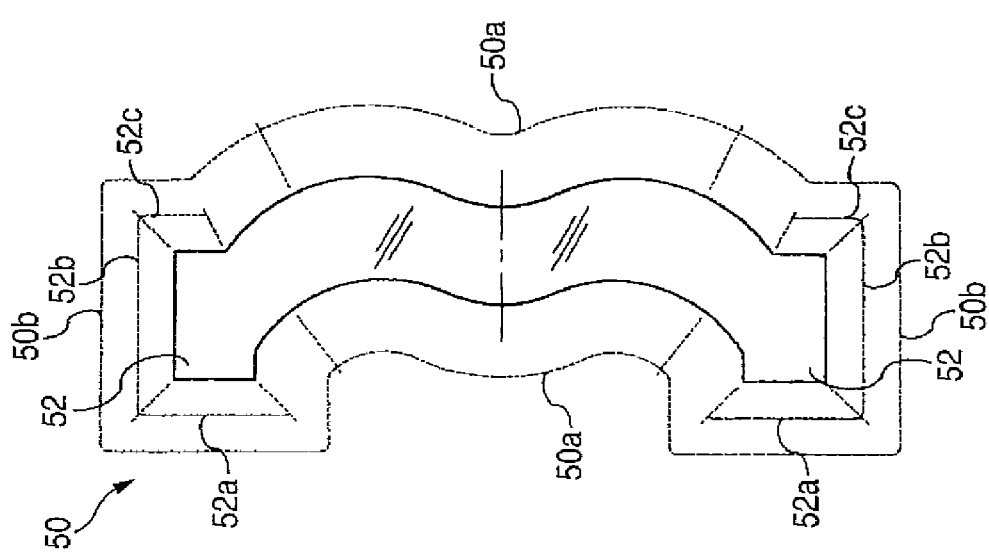

FIGS. 5 to 7 are enlarged section views showing the optical elements shown in FIG. 4. FIGS. 5(*a*) and 5(*b*) show first optical elements 30 and 35. FIGS. 6(a) and 6(b) show second optical elements 40 and 45. FIGS. 7(a) and 7(b) show third optical elements 50 and 55.

As shown in FIG. 4, the optical unit according to this embodiment includes the first optical element 30, 35 having flange parts 32, 37, the second optical element 40, 45 having flange parts 42, 47 and the third optical element 50, 55 having flange parts 52, 57. A holding part 5 of the optical unit holds the first, second, and third optical elements 30, 35, 40, 45, 50, 55 so that the first, second, and third optical elements 30, 35, 40, 45, 50, 55 have a common optical axis P, with diaphragm plates 2a and 2b interposed therebetween. On the rear side of the optical elements 30, 35, 40, 45, 50, 55, an imaging device 8 for receiving light passing through the optical elements 30, 35, 40, 45, 50, 55 and performing photoelectric conversion for the received light is disposed.

The optical element 30, 35, 40, 45, 50, 55, for example, the optical element 30 as shown in FIG. 5(a), is configured to have optical functional surfaces 30a and surfaces 30b which include surfaces 32a to 32c of the flange part 32 and which are located on the outer side with respect to the optical functional surfaces 30a. It should be noted that the configurations shown in FIGS. 5 and 7 are just examples. The invention is not limited thereto. In the following description, it is assumed that each flange part 32 includes a front surface 32a and a rear surface 32c which face the optical axis P and a side surface 32b which is substantially parallel to the optical axis P. However, the surface configuration of the flange part 32 is not limited thereto.

FIGS. 4(a), 4(c), and 4(e) show the cases where ghost or the like is generated due to the respective first, second, and third optical elements 30, 40, and 50. In any of these cases, incident light is repeatedly internally reflected by the surfaces 30b, 40b, and 50b located on the outer side with respect to the optical functional surfaces, particularly, by the rear, side and front surfaces 32a to 32c, 42a to 42c, 52a to 52c of the flange parts 32, 42, 52. Then, the light reflected by the surfaces 30b, 40b, 50b located on the outer side with respect to the optical functional surfaces reaches the imaging device 8, to thereby generate ghost or the like.

In at least one of the optical elements forming the optical unit according to this embodiment, rough surfaces 39, 49, 59 are formed on the surfaces 35b, 45b, 55b located on the outer side with respect to the optical functional surfaces, particularly, on at least one of the front, rear and side surfaces 37a to 37c, 47a to 47c, 57a to 57c of the flange parts 37, 47, 57. In the optical elements 35, 45, 55 shown in FIG. 5 to 7, the rough surfaces 39, 49, 59 are formed only on the rear surfaces 37c, 47c, 57c of the flange parts 37, 47, and 57.

As shown in FIG. 4(a), in the case where the ghost or the like is generated due to the first optical element 30, the first optical element 35 shown in FIG. 5(b) is used instead of the first optical element 30 (FIG. 5(a)). Thereby, generation of the ghost or the like is suppressed as shown in FIG. 4(b). That is, since light which has a large incidence angle and which is incident on the first optical element 35 is scattered by the surfaces 35b located on the outer side with respect to the optical functional surfaces, particularly, by the rough surfaces 39 formed on the rear portion 37c of the flange part 37, the light internally reflected by the flange parts 37a to 37c of the first optical element 35a does not form a false image or multiple images. As a result, generation of the ghost or the like is suppressed. Similarly, in the case where the ghost or the like is generated due to the second optical element 40 as shown in FIG. 4(c), the second optical element 45 shown in FIG. 6(b) is used instead of the second optical element 40 (FIG. 6(a)) is used. Thereby, generation of the ghost or the like is suppressed as shown in FIG. 4(d). In addition, in the case where the ghost or the like is generated due to the third optical element 50 as shown in FIG. 4(e), the third optical element 55 shown in FIG. 7(b) is used instead of the third optical element 50 (FIG. 7(a)). Thereby, generation of the ghost or the like is suppressed as shown in FIG. 4(f).

The surfaces 35b, 45b, 55b which are formed with the rough surfaces 39, 49, 59 and which are located on the outer side with respect to the optical functional surfaces are determined based on optical simulation or the like performed in advance. Depending on the result of the optical simulation, the rough surfaces may be formed on the surfaces 35b, 45b, 55b (for example, the rear, side, and front surfaces 37a to 37c, 47a to 47c, 57a to 57c of the flange parts 37, 47, 57) located on the outside side with respect to a plurality of optical functional surfaces of a plurality of optical elements (for example, the first, second, and third optical elements 35, 45, 55).

With the optical unit according to this embodiment, like the optical unit according to the first embodiment, there can be provided an optical unit capable of suppressing generation of the ghost or the like.

Figure 8:
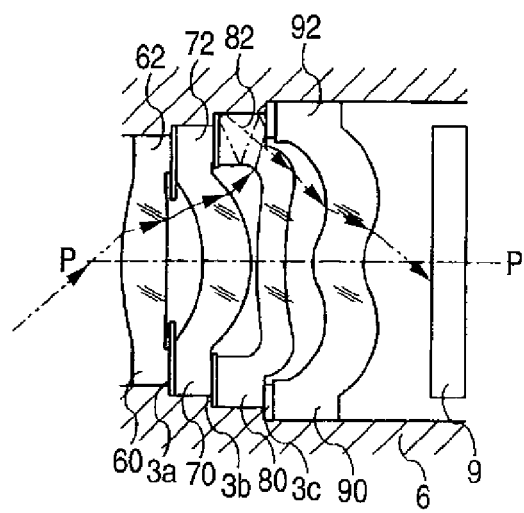
FIG. 8 is a section view showing a main portion of an optical unit according to a third embodiment of the invention.
Figure 8:
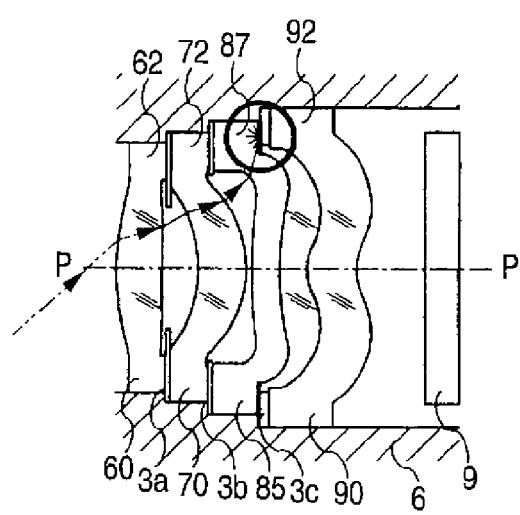
Figure 8:
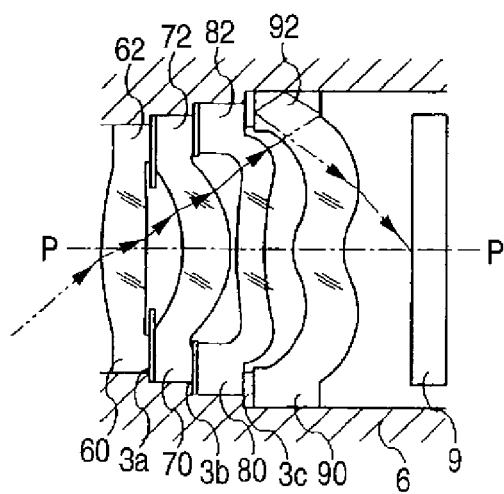
Figure 8:
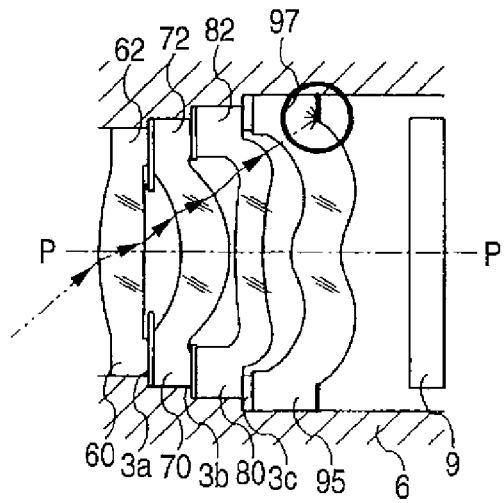

FIG. 8 is a section view showing a main portion of an optical unit according a third embodiment of the invention. FIGS. 8(a) and 8(c) show the cases where ghost or the like is generated due to incidence of unintended light. FIGS. 8(b) and 8(d) show the cases where the generation of ghost or the like is suppressed by forming rough surfaces 89, 99 on surfaces 85b, 95b located on an outer side with respect to optical functional surfaces. Hereinafter, the optical unit according to this embodiment will be described, and duplicate descriptions for parts which are the same as those in the first embodiment will be omitted.

Figure 9:
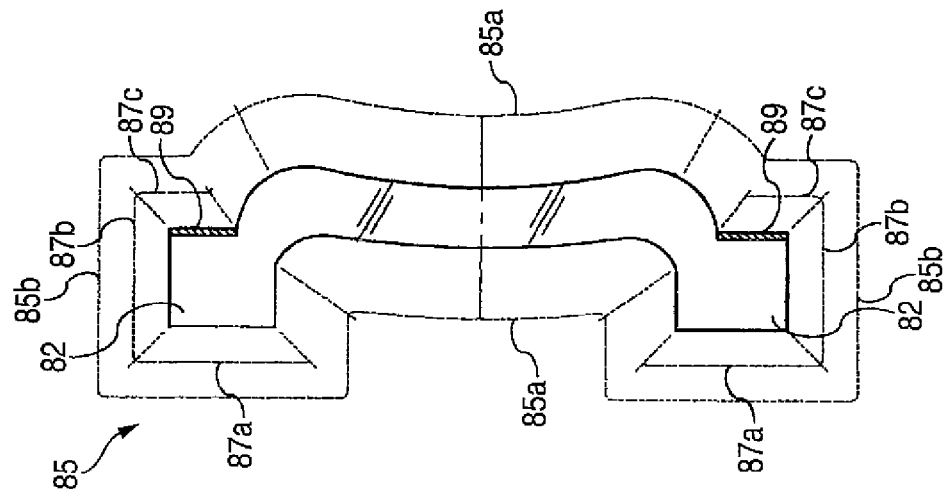
FIG. 9 is an enlarged section view showing optical elements shown in FIG. 8.
Figure 9:
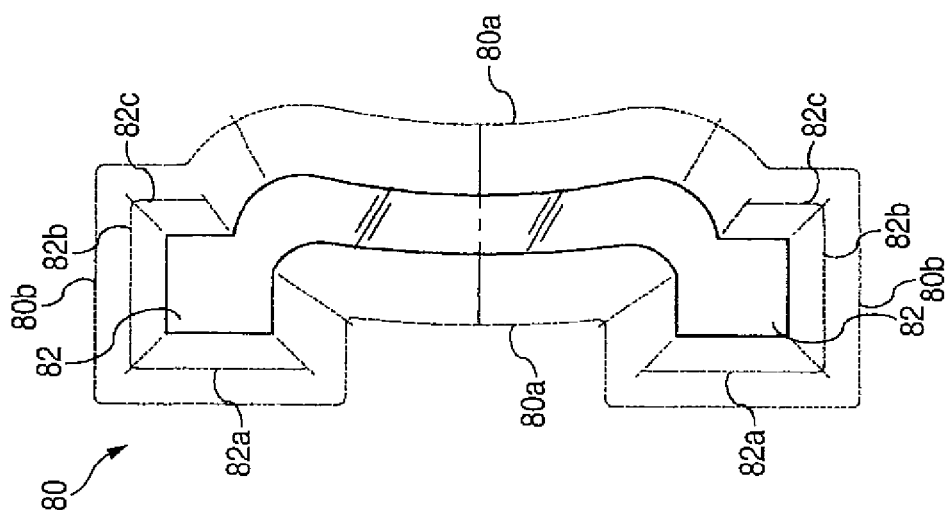
Figure 10:
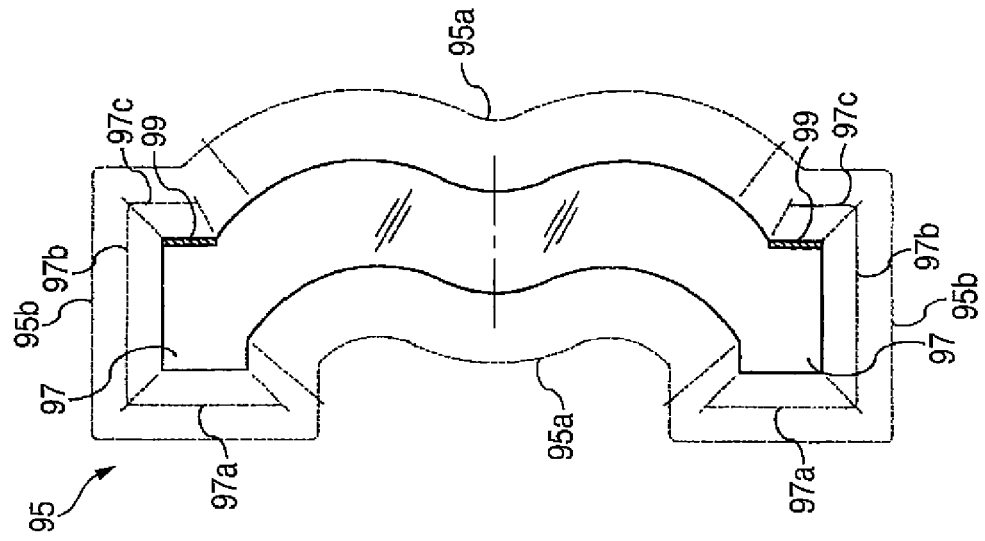
FIG. 10 is an enlarged section view showing the optical elements shown in FIG. 8.
Figure 10:
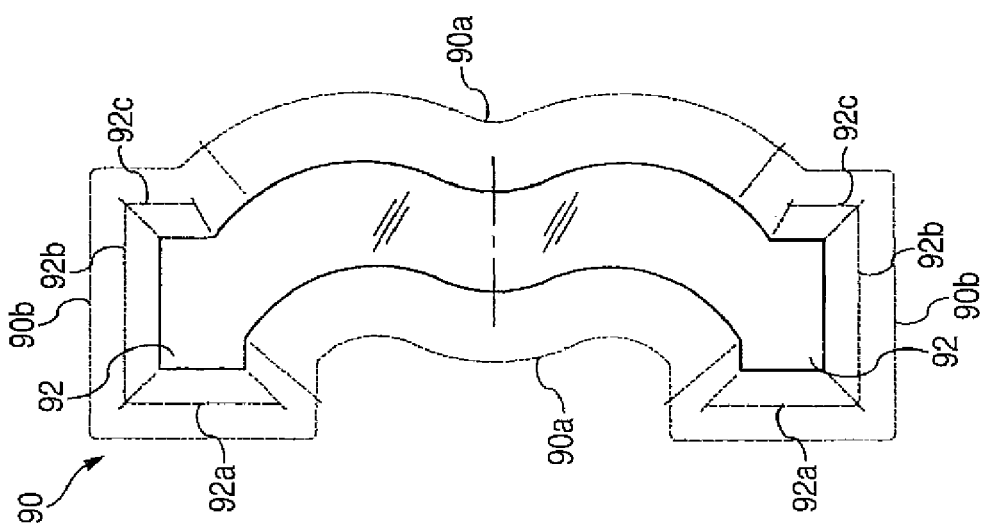

FIGS. 9 and 10 are enlarged section views showing the optical elements shown in FIG. 8. FIGS. 9(a) and 9(b) show third optical elements 80, 85. FIGS. 10(a) and 10(b) show fourth optical elements 90, 95.

As shown in FIG. 8, the optical unit according to this embodiment includes a first optical element 60 having flange parts 62, a second optical element 70 having flange parts 72, the third optical element 80, 85 having flange parts 82, 87, and the fourth optical element 90, 95 having flange parts 92, 97. A holding part 6 of the optical unit holds the first, second, third, and fourth optical elements 60, 70, 80, 85, 90, 95 so that the first, second, third, and fourth optical elements 60, 70, 80, 85, 90, 95 have a common optical axis P, with diaphragm plates 4a, 4b, and 4c interposed therebetween. On the rear side of the optical elements 60, 70, 80, 85, 90, 95, an imaging device 9 for receiving light passing through the optical elements 60, 70, 80, 85, 90, 95 and performing photoelectric conversion for the received light is disposed.

The optical element 60, 70, 80, 85, 90, 95, for example, the optical element 80 shown in FIG. 9(a) is configured to have optical functional surfaces 80a and surfaces 80b which include surfaces 82a to 82c of the flange part 82 and which are located on an outer side with respect to the optical functional surface 80a. It should be noted that the configurations shown in FIGS. 9 and 10 are just examples. The invention is not limited thereto. In the following description, it is assumed that each flange part 82 includes a front surface 82a and a rear surface 82c which face the optical axis P and a side surface 82b which is substantially parallel to the optical axis P. However, the surface configuration of the flange part 82 is not limited thereto.

FIGS. 8(a) and 8(c) show the cases where ghost or the like is generated due to the third and fourth optical elements 80, 90. In any of these cases, incident light is repeatedly internally reflected by the surfaces 80b, 90b located on the outer side with respect to the optical functional surfaces, particularly, by the rear, side, and front surfaces 82a to 82c, 92a to 92c of the flange parts 82, 92. Then, the light reflected by the surfaces 80b, 90b located on the outer side with respect to the optical functional surface reaches the imaging device 9. Thereby, ghost or the like is generated.

Rough surfaces 89, 99 are formed on the surfaces 85b, 95b, which are located on the outer side with respect to the optical functional surfaces, of at least one of the third and fourth optical elements forming the optical unit according to this embodiment, particularly, on at least one of the front, rear, and side surfaces 87a to 87c, 97a to 97c of the flange parts 87, 97. In the optical elements 85, 95 shown in FIGS. 9 and 10, the rough surfaces 89, 99 are formed only on the rear surfaces 87c, 97c of the flange parts 87, 97.

As shown in FIG. 8(*a*), in the case where the ghost or the like is generated due to the third optical element 80, the third optical element 85 shown in FIG. 9(*b*) is used instead of the third optical element 80 (FIG. 9(*a*)). Thereby, generation of the ghost or the like is suppressed as shown in FIG. 8(*b*). That is, light which has a large incidence angle and which is incident on the first optical element 85 passes through the first and second optical elements 60, 70, is incident on the third optical element 80, and is scattered by the surfaces 85b located on the outer side with respect to the optical functional surfaces, particularly, by the rough surfaces 89 formed on the rear surfaces 87c of the flange part 87. Therefore, the light internally reflected by the flange parts 87a to 87c of the third optical element 85 does not form an unintended image. As a result, generation of the ghost or the like is suppressed. Similarly, in the case where the ghost or the like is generated due to the fourth optical element 90 as shown in FIG. 8(*c*), the fourth optical element 95 shown in FIG. 10(*b*) is used instead of the fourth optical element 90 (FIG. 10(*a*)). Thereby, generation of the ghost or the like is suppressed as shown in FIG. 8(*d*).

The surfaces 85b, 95b which are formed with the rough surfaces 89 and 99 and which are located on the outer side with respect to the optical functional surfaces are determined based on optical simulation or the like performed in advance. Depending on the result of the optical simulation, the rough surfaces may be formed on the surfaces 85b, 95b (for example, the rear, side, and front surfaces 87a to 87c, 97a to 97c of the flange parts 87 and 97) located on the outer side with respect to a plurality of optical functional surfaces of a plurality of optical elements (for example, the third and fourth optical elements 85, 95).

With the optical unit according to this embodiment, like the optical units according to the first and second embodiments, there can be provided an optical unit capable of suppressing generation of the ghost or the like.

The exemplary embodiments of the invention have been described with reference to the accompanying drawings. However, the invention is not limited thereto. It is apparent that one skilled in the art would achieve various changes or modifications within the scope of claims. Those changes or modifications should be construed as belonging to the technical scope of the invention.

For example, in the description of the embodiments, described is the cases where the rough surfaces 19, 29, 39, 49, 59, 89, 99 are formed on the surfaces 15b, 25b, 35b, 45b, 55b, 85b, 95b located on the outer side with respect to the optical functional surfaces, particularly, on the flange surfaces 17, 27, 37, 47, 57, 87, 97. However, the invention is not limited thereto. In other words, the invention may be similarly applied to the case where the rough surfaces are formed on surfaces 15b, 25b, 35b, 45b, 55b, 85b, 95b which are located on the outer side with respect to the optical functional surfaces and on surfaces which are located on the outer side with respect to the flange surfaces 17, 27, 37, 47, 57, 87, 97.

What is claimed is:

1. An optical element comprising:
   an optical functional surface that refracts incident light; and
   a rough surface formed on a surface located on an outer side with respect to the optical functional surface, the rough surface that scatters the incident light which has been internally reflected, to prevent occurrence of a ghost, wherein the rough surface is formed to have a ten-point mean roughness in a range of 4 μm to 25 μm.

2. The optical element according to claim 1, further comprising:
   a flange part located on an outer side with respect to the optical functional surface, wherein the rough surface is disposed on a surface that forms the flange part.

3. The optical element according to claim 1, wherein the rough surface is formed by transferring a rough surface shape formed on a transfer surface of a molding.

4. The optical element according to claim 2, wherein the rough surface is formed by transferring a rough surface shape formed on a transfer surface of a molding.

5. The optical element according to claim 1, wherein the optical element is made of glass.

6. The optical element according to claim 2, wherein the optical element is made of glass.

7. The optical element according to claim 3, wherein the optical element is made of glass.

8. The optical element according to claim 4, wherein the optical element is made of glass.

9. The optical element according to claim 1, wherein the optical element is made of plastic.

10. The optical element according to claim 2, wherein the optical element is made of plastic.

11. The optical element according to claim 3, wherein the optical element is made of plastic.

12. The optical element according to claim 4, wherein the optical element is made of plastic.

13. The optical element according to claim 3, wherein the rough surface is formed at the same time as the optical functional surface is formed.

14. An optical unit comprising:
   one or more optical elements, wherein
   at least one of the one or more optical elements includes
   an optical functional surface that refracts incident light; and
   a rough surface formed on a surface located on an outer side with respect to the optical functional surface, the rough surface that scatters the incident light which has been internally reflected, to prevent occurrence of a ghost, wherein the rough surface is formed to have a ten-point mean roughness in a range of 4 μm to 25 μm.

* * * * *